United States Patent
Hardinghaus et al.

(10) Patent No.: US 10,486,980 B2
(45) Date of Patent: Nov. 26, 2019

(54) PROCESS FOR MANUFACTURE OF PURIFIED ALKALINE EARTH METAL CARBONATE

(71) Applicant: SOLVAY SA, Brussels (BE)

(72) Inventors: Ferdinand Hardinghaus, Bad Honnef (DE); Erik Bonmann, Neuwied (DE); Achim Engels, St. Katharinen (DE)

(73) Assignee: SOLVAY SA, Brussels (BE)

( * ) Notice: Subject to any disclaimer, the term of this patent is extended or adjusted under 35 U.S.C. 154(b) by 34 days.

(21) Appl. No.: 15/328,210

(22) PCT Filed: Jul. 21, 2015

(86) PCT No.: PCT/EP2015/066622
§ 371 (c)(1),
(2) Date: Jan. 23, 2017

(87) PCT Pub. No.: WO2016/012438
PCT Pub. Date: Jan. 28, 2016

(65) Prior Publication Data
US 2017/0217782 A1    Aug. 3, 2017

(30) Foreign Application Priority Data

Jul. 23, 2014  (EP) .................................... 14178196

(51) Int. Cl.
*C01F 11/18*  (2006.01)

(52) U.S. Cl.
CPC .......... *C01F 11/187* (2013.01); *C01F 11/185* (2013.01); *C01F 11/186* (2013.01); *C01F 11/188* (2013.01); *C01P 2004/51* (2013.01); *C01P 2004/60* (2013.01); *C01P 2004/61* (2013.01); *C01P 2006/12* (2013.01); *C01P 2006/80* (2013.01)

(58) Field of Classification Search
CPC .................................................... C01F 11/187
See application file for complete search history.

(56) References Cited

U.S. PATENT DOCUMENTS

| | | | |
|---|---|---|---|
| 1,673,985 A | 6/1928 | Marwedel et al. | |
| 3,743,691 A | 7/1973 | Trew et al. | |
| 4,508,690 A * | 4/1985 | Obrist ....................... | C01F 5/02 423/165 |
| 5,122,350 A * | 6/1992 | Bryan ..................... | C04B 2/102 252/70 |
| 5,366,513 A | 11/1994 | Goldmann et al. | |
| 5,395,806 A | 3/1995 | Adam, Jr. et al. | |
| 6,761,869 B1 * | 7/2004 | Virtanen ................. | C01F 11/18 423/432 |
| 2009/0213527 A1 | 8/2009 | Koebrugge et al. | |

FOREIGN PATENT DOCUMENTS

| | | |
|---|---|---|
| DE | 102010030473 A1 | 12/2011 |
| EP | 2447213 A1 | 5/2012 |
| JP | 52062199 A2 | 1/1981 |

OTHER PUBLICATIONS

Robert Kresse et al. "Barium and barium compounds" in: "Ullmann's Encyclopedia of Industrial Chemistry", Jul. 15, 2007 (Jul. 15, 2007), Wiley-VCH Verlag GmbH & Co. KGaA, Weinheim, Germany, XP055153123, ISBN:978-3-52-730673-2 vol. 4, pp. 621-640, DOI:10,1002/14356007,a03_325.pub2, p. 632.

* cited by examiner

*Primary Examiner* — Stuart L Hendrickson

(57) ABSTRACT

Process for manufacture of purified alkaline earth metal carbonate The invention concerns a process for the manufacture of a purified alkaline earth metal carbonate, the purified alkaline earth metal carbonate obtainable by said process, and its use in the manufacture of products and devices in the field of electronics and glass. The process comprises the steps of calcinating the alkaline earth metal carbonate with an aqueous phase comprising a salt. The alkaline earth metal carbonate might be barium carbonate or strontium carbonate.

13 Claims, No Drawings

PROCESS FOR MANUFACTURE OF PURIFIED ALKALINE EARTH METAL CARBONATE

This application is a U.S. national phase entry under 35 U.S.C. § 371 of International Application No. PCT/EP2015/066622, filed on Jul. 21, 2015, which claims priority to European Application No. 14178196.3, filed on Jul. 23, 2014. The entire contents of these applications are explicitly incorporated herein by this reference.

The invention concerns a process for the manufacture of a purified alkaline earth metal carbonate, the purified alkaline earth metal carbonate obtainable by said process, and its use in the manufacture of products and devices in the field of electronics and glass.

High purity alkaline earth metal carbonates, such as SrCO3 and BaCO3, are of high importance in the application of the alkaline earth metal carbonates in the electronic and glass industry. Especially, reduction of the total sulfur content in alkaline earth metal carbonate is a concern as the use of such carbonates in the field of glass and electronics, such as batteries, thermistors, capacitors, ceramic electrical components and radio components, require low sulfur contents. Other applications of alkaline earth metal carbonates, for example ceramics, pigments, rubber, paints or welding rods also benefit from low sulfur contents. Sulfur content is usually high in alkaline earth metal carbonates, as the carbonates are typically produced via reduction of the alkaline earth metal sulfate to sulfide and subsequent carbonation to the alkaline earth metal carbonate. The contamination of the alkaline earth metal carbonate product with sulfur containing impurities is inherent in this process. Other process steps or alternative processes can also lead to contamination with sulfur containing impurities. It is further desirable to reduce the amount of other impurities from alkaline earth metal carbonates, such as sodium containing impurities.

JP1031673 describes the addition of a basic compound to the reaction of BaS with CO2, heating the resulting BaCO3 in an oxygen-free gas stream, and subsequent washing and drying. The resulting product has a sulfur content of 170 ppm.

It is an object of the invention to provide an improved process for the purification of alkaline earth metal carbonate, specifically to reduce the sulfur content of the alkaline earth metal carbonate. Other impurities can also be reduced by the process. The process according to the present invention thus comprises the steps of
a) calcining said alkaline earth metal carbonate,
b) washing the calcinated alkaline earth metal carbonate with an aqueous phase comprising a salt.

The invention further concerns a purified alkaline earth metal carbonate, obtainable the process according to the present invention, and its use in the manufacture of products and devices in the electronics and glass industry.

It should be noted that "reducing the sulfur content" or "reducing impurities" does not imply that the underlying chemical concept of the present invention is restricted to or solely based on a chemical reduction, meaning a reduction of the oxidation state, of such an impurity. In this context, "reducing" or "reduction" rather means that the purified alkaline earth metal carbonate contains a lower amount of impurities, in particular sulfuric impurities, than the alkaline earth metal carbonate provided to the process; the content of said impurities is reduced. This does, on the other hand, not exclude that chemical reduction processes can be involved in the impurity content reduction according to the present invention.

In the present invention, alkaline earth metal carbonate intends to denote a compound of the formula $MCO_3$, wherein M is a metal of the second main group of the chemical periodic system, also known as alkaline earth metals. Preferred alkaline earth metal carbonates according to this invention are $BaCO_3$ and $SrCO_3$. Mixtures of two or more earth metal carbonates are also included in term "alkaline earth metal carbonate".

In a preferred embodiment of the present invention, the alkaline earth metal carbonate, or a mixture of two or more alkaline earth metal carbonates, being provided to the process step a) according to the invention, is manufactured from MS, which is often manufactured by reduction of $MSO_4$.

In the present invention, the "sulfur content" is expressed in ppm. It is measured by oxidation of all sulfur impurities in an alkaline earth metal carbonate sample by addition of an aqueous bromine solution, addition of HCl and subsequent retrieval and gravimetrical analysis of the insoluble MSO4 which is formed. The content MSO4 in the sample is expressed as wt. %, and the total sulfur content can be calculated from this amount by multiplying with factor 0.1373. The wt. % may also be expressed as ppm, wherein 1 wt. % is 10.000 ppm. The sulfur content can be suitably determined according to the following procedure:

About 25 g MCO3 was weighed, exact to 4 digits after the comma, into a 600 mL beaker. 250 ml distilled water, filter paper flakes and a round of filter paper were added. 100 mL of a saturated solution of bromine in water was added, followed by cautious addition of 30 mL of conc. HCl. Distilled water was added to reach a total volume of 400 mL. The beaker was heated, thereby reducing the volume of the solution to 100-150 mL. The mixture was filtered via filter paper, and the residue washed with hot distilled water until the filtrate was chloride-free. The filter paper was burned in a tared Pt crucible at 800-900° C. in a furnace until constant weight was reached. The weight difference vs. tared, empty crucible is the content of $MSO_4$ and is used to calculate the sulfur content of the weighed $MCO_3$ sample.

Other cationic impurities, such as $Na^+Li^+$, $Ni^+$, $Mn^{2+}$, $Fe^{3+}$, $Al^{3+}$, etc., can be suitably determined via ICP-OE-spectrometry after digestion of the sample MCO3 with aq. HCl.

Generally, the alkaline earth metal carbonate which is provided to the process in a step a) contains impurities, in particular sulfuric impurities. The total sulfur content of the alkaline earth metal carbonate which is provided to step a), or the content in other impurities, can have a wide range of values. In one aspect of the invention, the alkaline earth metal carbonate, provided in step a) of the process according to the present invention, generally contains a total sulfur content A. A is expressed in ppm. In this aspect, A generally has a value of from 200 to 1700 ppm. Often, A is equal to or higher than 200 ppm. Preferably, A is equal to or higher than 250 ppm. Even more preferably, A is equal to or higher than 270 ppm. Most preferably, A is equal to or higher than 300 ppm. Generally, A is equal to or lower than 1700 ppm. More often, A is equal to or lower than 1650 ppm. Preferably, A is equal to or lower than 1600 ppm. More preferably, A is equal to or lower than 1550 ppm. Most preferably, A is equal to or lower than 1500 ppm.

Generally, the particle size of the alkaline earth metal carbonate which is provided to step a) can have a wide range of values. In one embodiment of the present invention, the alkaline earth metal carbonate which is provided to step a)

of the process, has a specific particle size. Often, the particles of the alkaline earth metal carbonate, provided to step a) of the process according to the present invention, have a D90 value of from 12 to 30 µm. Often, the D90 value is equal to or higher than 12 µm. Preferably, the D90 value is equal to or higher than 13 µm. Even more preferably, the D90 value is equal to or higher than 14 µm. Most preferably, the D90 value is equal to or higher than 15 µm. Generally, the D90 value is equal to or lower than 30 µm. More often, the D90 value is equal to or lower than 29 µm. Preferably, the D90 value is value is equal to or lower than 28 µm. More preferably, the D90 value is equal to or lower than 27 µm. Most preferably, the D90 value is equal to or lower than 26 µm. The D90 value determines that 90% of all particles have a particle size of equal to or lower than the D90 value. Often, the particles of the alkaline earth metal carbonate, provided to step a) of the process according to the present invention, have a D50 value of from 2,5 to 9 µm. Often, the D50 value is equal to or higher than 2,5 µm. Preferably, the D50 value is equal to or higher than 3 µm. Even more preferably, the D50 value is equal to or higher than 3,5 µm. Most preferably, the D50 value is equal to or higher than 4 µm. Generally, the D50 value is equal to or lower than 9 µm. More often, the D50 value is equal to or lower than 8,5 µm. Preferably, the D50 value is equal to or lower than 8 µm. More preferably, the D50 value is equal to or lower than 7,5 µm. Most preferably, the D50 value is equal to or lower than 7 µm. The D50 value determines that 50% of all particles have a particle size of equal to or lower than the D50. The particle size is suitably determined by laser diffraction.

Generally, the BET value of the alkaline earth metal carbonate which is provided to step a) can have a wide range of values. In one embodiment of the present invention, the alkaline earth metal carbonate which is provided to step a) has a BET value of from 1 to 10 g/m². The BET value describes the specific surface area of the particle, and is measured by the physical adsorption of gas molecules on the surface of the particle. The BET is suitably measured by N2 isothermic adsorption according to the method of Brenauer-Emmet-Teller (BET).

According to the process of the present invention, an alkaline earth metal carbonate is provided to the process in a step a) and the alkaline earth metal carbonate is calcinated. "Calcination" is intended to denote a thermal treatment process, which is preferably performed in the presence of a gas comprising oxygen. In another aspect of the invention, the calcination is carried out in an inert atmosphere free of oxygen. Calcination is carried out in suitable reactors, such as furnaces or reactors, sometimes referred to as kilns or calciners, of various designs including shaft furnaces, rotary kilns, multiple hearth furnaces, and fluidized bed reactors. The calcination may be carried out continuously or batch-wise. The calcination temperature is chosen such that the carbonate does not decompose. Generally, the calcination temperature is from 150 degrees Celsius to 1000 degrees Celsius. Generally, the calcination temperature is equal to or more than 150 degrees Celsius. Preferably, the calcination temperature is equal to or more than 300 degrees Celsius. Most preferably, the calcination temperature is equal to or more than 500 degrees Celsius. Often, the calcination temperature is equal to or lower than 1000 degrees Celsius. Preferably, the calcination temperature is equal to or lower than 950 degrees Celsius. Most preferably, the calcination temperature is equal to or lower than 900 degrees Celsius. Generally, the calcination temperature is held for from 30 minutes to 3 hours. Often, the calcination temperature is held for equal to or more than 30 minutes. Preferably, the calcination temperature is held for equal to or more than 45 minutes. Most preferably, the calcination temperature is held for equal to or more than 1 hour. Often, the calcination temperature is held for equal to or less than 3 hours. Preferably, the calcination temperature is held for equal to or less than 2,5 hours. Most preferably, the calcination temperature is held for equal to or less than 2 hours.

The calcination process is preferably performed under ambient pressure. Calcination at elevated pressure or reduced pressure (vacuum) is also possible.

The calcination product has generally a granular character, intending to denote that it forms larger particles in the calcination process compared to the particles provided to the calcination step. Without wishing to be bound by any particular theory, it is believed that sulfuric impurities are converted during calcination into sulfuric impurities which are soluble in the aqueous metal salt phase used in step b), and further migrate to the surface of the calcinated particles during the calcination operation, thereby becoming accessible to a washing operation in step b). It has been surprisingly found that washing the calcinated product with an aqueous phase containing one or more metals salt significantly reduces the total sulfur content of the calcination product. Other impurities can also be reduced. This significant effect provides substantially better results compared to washing uncalcinated alkaline earth metal carbonates.

Generally, the particle size of the alkaline earth metal carbonate which is provided to step b), which is the calcination product, can have a wide range of values. In one embodiment of the present invention, the alkaline earth metal carbonate which is provided to step b) of the process, has a specific particle size.

Often, the particles of the alkaline earth metal carbonate, provided to step b) of the process according to the present invention, have a D90 value of from 700 to 1100 µm. Often, the D90 value is equal to or higher than 725 µm. Preferably, the D90 value is equal to or higher than 750 µm. Even more preferably, the D90 value is equal to or higher than 775 µm. Most preferably, the D90 value is equal to or higher than 800 µm. Generally, the D90 value is equal to or lower than 1100 µm. More often, the D90 value is equal to or lower than 1075 µm. Preferably, the D90 value is equal to or lower than 1050 µm. More preferably, the D90 value is equal to or lower than 1025 µm. Most preferably, the D90 value is equal to or lower than 1000 µm. The D90 value determines that 90% of all particles have a particle size of equal to or lower than the D90. Often, the particles of the alkaline earth metal carbonate, provided to step b) of the process according to the present invention, have a D50 value of from 350 to 750 µm. Often, the D50 value is equal to or higher than 350 µm. Preferably, the D50 value is equal to or higher than 360 µm. Even more preferably, the D50 value is equal to or higher than 370 µm. Most preferably, the D50 value is equal to or higher than 380 µm. Generally, the D50 value is equal to or lower than 750 µm. More often, the D50 value is equal to or lower than 740 µm. Preferably, the D50 value is equal to or lower than 730 µm. More preferably, the D50 value is equal to or lower than 720 µm. Most preferably, the D50 value is equal to or lower than 710 µm. The D50 value determines that 50% of all particles have a particle size of equal to or lower than the D50. The particle size suitably is determined by laser diffraction.

Preferably, the calcination is performed on alkaline earth metal carbonate which has not been dried after an optional previous process step. Often, this previous process step is a precipitation of the alkaline earth carbonate from a MS solution. Independent from the chemical nature of the optional previous process step, in which $MCO_3$ is produced, generally the alkaline earth metal carbonate has a water content of from 10 to 60 wt. % before the calcination step. Often, the water content of the alkaline earth metal carbonate before the calcination step is equal to or higher than 12 wt. %. Preferably, the water content of the alkaline earth metal carbonate before the calcination step is equal to or higher than 10 wt. %. Most preferably, the water content of the alkaline earth metal carbonate before the calcination step is equal to or higher than 15 wt. %. Often, the water content of the alkaline earth metal carbonate before the calcination step is equal to or lower than 60 wt. %. Preferably, the water content of the alkaline earth metal carbonate before the calcination step is equal to or lower than 55 wt. %. More preferably, the water content of the alkaline earth metal carbonate before the calcination step is equal to or lower than 52 wt. %. Most preferably, the water content of the alkaline earth metal carbonate before the calcination step is equal to or lower than 50 wt. %. In another aspect of the present invention, water can be added to dry alkaline earth metal carbonate before the calcination operation in order to achieve the abovementioned water content. In a further aspect of the invention, a binding agent can be added to the alkaline earth carbonate, for example as described in U.S. Pat. No. 5,366,513, which is incorporated hereby by reference in its entirety, to improve the granulation effect in the calcination operation.

In one aspect of the present invention, the alkaline earth metal carbonate is cooled after the calcination step. The cooling can be performed either actively, for example by cooling the calcination apparatus, or passively, by removal of the heat source and leaving to cool the product in the calcination apparatus. Often, the calcination product is cooled to ambient temperature after calcination. Preferably, the calcination product is cooled to a temperature of equal to or higher than 5° C. More preferably, the calcination product is cooled to a temperature of equal to or higher than 10° C. Most preferably, the calcination product is cooled to a temperature of equal to or higher than 15° C. Preferably, the calcination product is cooled to a temperature of equal to or lower than 95° C. More preferably, the calcination product is cooled to a temperature of equal to or higher than 80° C. Most preferably, the calcination product is cooled to a temperature of equal to or higher than 65° C.

In the process according to the present invention, the calcinated and optionally cooled alkaline earth metal carbonate is washed in step b) with an aqueous phase containing at least one metal salt. Generally, the at least one metal salt contained in the aqueous phase used in step b) is selected such that the sulfate of the cation contained in the metal salt has a higher solubility in water than the sulfate of the alkaline earth metal cation contained in the one or more alkaline earth metal carbonate. In this context, "higher solubility" intends to denote that the sulfate or sulfates of the cation in the one or more metal salts has a higher solubility in g/100g water at 25° C. than the sulfate or sulfates of the one or more alkaline earth metal cation contained in the one or more alkaline earth metal carbonate. Preferably, the cation of the metal salt contained in the aqueous phase of step b) is selected from the group of alkaline metals, which is the group consisting of Na+, K+, Li+, Cs+, Rb+. Na+ and Li+ are preferred cations, Na+ is the most preferred cation. The anion of the metal salt contained in the aqueous phase in step b) is generally selected from the group consisting of carbonate, chloride, bromide, phosphate and citrate, wherein carbonate is preferred. The most preferred metal salt contained in the aqueous phase in step b) is $Na_2CO_3$. Mixtures of one or more metal salts are also denoted by the term "metal salt".

The aqueous phase of step b) has a content of metal salt which is related to the sulfur content of the calcinated alkaline earth metal carbonate. Generally, the aqueous phase of step b) contains at least one stoichiometric equivalent of metal salt. By way of illustration, stoichiometric equivalent denotes one mol metal salt cation, if the cation is divalent, or two moles metal salt cation, if the cation is monovalent, per theoretical mol $MSO_4$ present in the sample as measured by gravimetrical analysis as explained above. Preferably, the metal salt content in the aqueous phase in step b) is equal to or more than 3 stoichiometric equivalents. Most preferably, the metal salt content in the aqueous phase in step b) is equal to or more than 6 stoichiometric equivalents. Often, the metal salt content in the aqueous phase in step b) is equal to or lower than 30 stoichiometric equivalents. Preferably, the metal salt content in the aqueous phase in step b) is equal to or lower than 25 stoichiometric equivalents. Most preferably, the metal salt content in the aqueous phase in step b) is equal to or lower than 21 stoichiometric equivalents. In a most preferred aspect, the metal salt content in the aqueous phase in step b) is from 10 to 20 stoichiometric equivalents.

In a batch process in which step b) is performed on a batch of MCO3 by stirring the MCO3 with the aqueous phase, the volume of the aqueous phase in step b) generally is equal to or larger than one volume equivalent of the bulk volume of the batch MCO3. The volume of the aqueous phase is mainly determined by the stirrability of the batch one the aqueous phase has been added. The volume of aqueous phase preferably is equal to or larger than 1,5 volume equivalents of the bulk volume of the batch MCO3. The volume of aqueous phase often is equal to or smaller than 8 volume equivalents of the bulk volume of the batch MCO3. Preferably, the volume of aqueous phase often is equal to or smaller than 5 volume equivalents of the bulk volume of the batch MCO3. More preferably, the volume of aqueous phase often is equal to or smaller than 3 volume equivalents of the bulk volume of the batch MCO3.

The temperature of the aqueous phase in step b) generally is from 0° C. to X° C., wherein X denotes the boiling point of the aqueous wash solution containing alkaline metal salt. Often, the temperature of the aqueous phase and/or the temperature maintained after addition of the phase in step b) is equal to or higher than 5° C. More preferably, the temperature of the aqueous phase and/or the temperature maintained after addition of the aqueous phase in step b) is equal to or higher than 10° C. Most preferably, the temperature of the aqueous phase and/or the temperature maintained after addition of the aqueous phase in step b) is equal to or higher than 15° C. Generally, the temperature of the aqueous phase and/or the temperature maintained after addition of the aqueous phase in step b) is equal to or lower than X° C. More preferably, the temperature of the aqueous phase and/or the temperature maintained after addition of the aqueous phase in step b) is equal to or lower than (X-5)° C. Most preferably, the temperature of the aqueous phase and/or the temperature maintained after addition of the aqueous phase in step b) is equal to or lower than (X-10)° C.

In one embodiment of the invention, step b) is carried out by addition of the aqueous phase to the calcinated alkaline earth metal carbonate, or, alternatively, by addition of the calcinated alkaline earth metal carbonate to the aqueous phase. Stirring is applied during and/or after addition. The stirring time often is from 30 seconds to 6 hours. Preferably, the stirring time is equal to or longer than 1 minute. More preferably, the stirring time is equal to or longer than 5 minutes. Most preferably, the stirring time is equal to or longer than 10 minutes. Preferably, the stirring time is equal to or shorter than 5 hours. More preferably, the stirring time is equal to or shorter than 3 hours. Most preferably, the stirring time is equal to or shorter than 1 hour. In another aspect of the present invention, step b) can be carried out by rinsing the calcinated alkaline earth metal carbonate, for example by placing the alkaline earth metal carbonate on a filter or in another solid/liquid separation apparatus, and adding the aqueous phase to the alkaline earth metal carbonate, separating the spent washing solution from the alkaline earth metal carbonate after passing through the bed of alkaline earth metal carbonate. In yet another aspect of the invention, the suspension of the calcinated alkaline earth metal carbonate in the aqueous phase is stirred, then filtered and the bed of alkaline earth metal carbonate rinsed. One or more of step b) are optionally performed subsequently, advantageously separating the spent aqueous phase from the alkaline earth metal carbonate between steps. Optionally, the alkaline earth metal carbonate is washed with water between repeated steps b). When step b) is repeated one or more times, the alkaline earth metal carbonate optionally is submitted to a drying step, such as applying heat, vacuum of an air stream, between repeated steps b), although this is not preferred. Step b) or multiple steps b) can be carried out batch-wise or continuously.

After completed washing of the alkaline earth metal carbonate in step b), the spent aqueous phase is suitably separated from the earth alkaline metal. Suitable methods for separating the spent aqueous phase include, for example, filtering, spinning or decanting.

In one preferred embodiment of the invention, the alkaline earth metal carbonate is washed with an aqueous washing agent after step b). Preferably, the aqueous washing agent is water. The term "water" intends to denote water of any quality (e.g. deionized water, purified water, distilled water, double-distilled water, filtered water, water from industrial processes or also municipal water, tap water, hard water, soft water). In another aspect of the invention, the alkaline earth metal carbonate of step b) is washed after step b) with an aqueous washing agent containing a salt. Often, the temperature of the water or aqueous phase and/or the temperature maintained after addition of the water or aqueous washing agent is equal to or higher than 5° C. More preferably, the temperature of the aqueous washing agent or the temperature maintained after addition of the aqueous washing agent is equal to or higher than 10° C. Most preferably, the temperature of the aqueous washing agent and/or the temperature maintained after addition of the aqueous washing agent is equal to or higher than 15° C. Generally, the temperature of the aqueous washing agent and/or the temperature maintained after addition of the aqueous washing agent is equal to or lower than Y° C., wherein Y is the boiling temperature of the aqueous washing agent, e.g. Y=100 when water is used as aqueous washing agent. More preferably, the temperature of the aqueous washing agent and/or the temperature maintained after addition of the aqueous washing agent is equal to or lower than (Y-2)° C. Most preferably, the temperature of the water or aqueous phase and/or the temperature maintained after addition of the aqueous washing agent is equal to or lower than (Y-10)° C. It is preferred that the washing step using the aqueous washing agent is performed in the same reactor as step b) or the liquid/solid separation apparatus used to separate the spent aqueous phase containing a metal salt from the alkaline earth metal carbonate after step b). Optionally, the alkaline earth metal carbonate can also be transferred to a suitable reactor for washing with an aqueous washing agent after step b). The aqueous washing agent can be separated from the alkaline earth metal carbonate after completed washing by suitable techniques selected from the group consisting of filtration, spinning and decanting. One or more steps b), separating the aqueous phase of step b) from the alkaline earth metal carbonate and washing the alkaline earth metal carbonate with an aqueous washing agent can be combined in any suitable order. If one or more steps b), separating the aqueous phase of step b) from the alkaline earth metal carbonate and washing the alkaline earth metal carbonate with an aqueous washing agent are combined, the alkaline earth metal carbonate is preferably not dried between the steps, although a partial or complete drying can be performed if desired. It has surprisingly been shown that the amount of cationic impurities, e.g. from the metal salt contained in the aqueous phase in step b), in particular in the case of the use of soda ash in the aqueous washing solution in step b), is not significantly higher, and may even be reduced, especially if water is used in a washing step after step b). In the case when $Na_2CO_3$ is contained in the aqueous phase in step b), the final sodium content of the alkaline earth metal carbonate is often equal to or less than 150 ppm. Preferably, the final sodium content of the alkaline earth metal carbonate is equal to or less than 120 ppm. Most preferably, the final sodium content of the alkaline earth metal carbonate is equal to or less than 100 ppm.

In one preferred embodiment of the invention, the alkaline earth metal carbonate is dried after step b) after the separation of the aqueous phase from the alkaline earth metal carbonate or after the separation of the aqueous washing agent of a washing step from the alkaline earth metal carbonate subsequent to step b). Drying of the purified alkaline earth metal carbonate can be performed by methods known to the person skilled in the art, for example, by selecting one or more techniques from the group consisting of heating, applying vacuum, or blowing a gas through or on the alkaline earth metal carbonate. A preferred drying procedure comprises heating the purified alkaline earth metal carbonate in a rotary kiln. Often, the drying temperature, independent of the apparatus, is from 40° C. to 300° C. Generally, the drying temperature is equal to or higher than 45° C. More preferably, the drying temperature is equal to or higher than 60° C. Most preferably, the drying temperature is equal to or higher than 80° C. Generally, the drying temperature is equal to or lower than 800° C. Preferably, the drying temperature is equal to or lower than 500° C. More preferably, the drying temperature is equal to or lower than 230° C. Most preferably, the drying temperature is equal to or lower than 200° C. The residual moisture content can be adjusted to a desirable level by choosing the appropriate drying conditions, such as temperature and time. Generally the alkaline earth metal carbonate after drying has a water content of from 10 to 1000 ppm. Preferably, the water content of the alkaline earth metal carbonate after drying is equal to or higher than 10 ppm. Even more preferably, the water content of the alkaline earth metal carbonate after drying is equal to or higher than 15 ppm. Most preferably, the water content of the alkaline earth metal carbonate after drying is equal to or higher than 20 ppm. Preferably, the water content of the alkaline earth metal carbonate after drying is equal to or lower than 1000 ppm. Even more preferably, the water content of the alkaline earth metal carbonate after drying is equal to or lower than 950 ppm.

Most preferably, the water content of the alkaline earth metal carbonate after drying is equal to or lower than 900 ppm.

In one embodiment of the invention, the alkaline earth metal carbonate obtained by the drying step can be further granulated thermally in a separate granulation process by thermal treatment at temperatures of from 60° C. to 850° C.

In another embodiment of the present invention, granulation auxiliaries, such as NaOH or sodium silicate, are added to the alkaline earth metal carbonate during drying and/or subsequent separate granulation.

The invention further concerns a purified alkaline earth metal carbonate, obtainable by the following process :
a) calcining an alkaline earth metal carbonate,
b) washing the calcinated alkaline earth metal carbonate with an aqueous phase comprising a salt.

Other aspects of the process have been described above.

The purified alkaline earth metal carbonate, which is obtainable by the process according to the present invention, displays a low content of impurities, in particular in total sulfur. Low sulfur content in alkaline earth metal carbonate is desirable, especially in the glass and electronics field, where alkaline earth metal carbonates are used. It has so far not been possible to reduce the total sulfur content to very low amounts as has been shown surprisingly according to the present invention, especially if the alkaline earth metal carbonate is manufactured from MS or in other processes involving sulfur containing intermediates or starting material. In one aspect, the alkaline earth metal carbonate obtainable by the process according to the present invention is manufactured from MS by reaction with CO2 or an alkaline earth metal carbonate. The MS often is manufactured by reduction of $MSO_4$. Generally, the total sulfur content of the purified alkaline earth metal carbonate is from 0.1 ppm to 200 ppm. Often, the final total sulfur content of the purified alkaline earth metal carbonate is equal to or less than 200 ppm. Preferably, the final total sulfur content is equal to or less than 150 ppm. More preferably, the final total sulfur content is equal to or less than 100 ppm. Most preferably, the total sulfur content is equal to or less than 80 ppm. Often, the final total sulfur content of the purified alkaline earth metal carbonate is equal to or higher than 0.1 ppm. Preferably, the final total sulfur content is equal to or higher than 1 ppm. More preferably, the final total sulfur content is equal to or higher than 2 ppm. Most preferably, the total sulfur content is equal to or higher than 3 ppm.

Generally, the particle size of the purified alkaline earth metal carbonate can have a wide range of values. In one embodiment of the present invention, the purified alkaline earth metal carbonate has a specific particle size.

Often, the purified alkaline earth metal carbonate has a D90 value of from 700 to 1100 μm. Often, the D90 value is equal to or higher than 725 μm. Preferably, the D90 value is equal to or higher than 750 μm. Even more preferably, the D90 value is equal to or higher than 775 μm. Most preferably, the D90 value is equal to or higher than 800 μm. Generally, the D90 value is equal to or lower than 1100 μm. More often, the D90 value is equal to or lower than 1075 μm. Preferably, the D90 value is equal to or lower than 1050 μm. More preferably, the D90 value is equal to or lower than 1025 μm. Most preferably, the D90 value is equal to or lower than 1000 μm. The D90 value determines that 90% of all particles have a particle size of equal to or lower than the D90. Often, the purified alkaline earth metal carbonate has a D50 value of from 350 to 750 μm. Often, the D50 value is equal to or higher than 350 μm. Preferably, the D50 value is equal to or higher than 360 μm. Even more preferably, the D50 value is equal to or higher than 370 μm. Most preferably, the D50 value is equal to or higher than 380 μm. Generally, the D50 value is equal to or lower than 750 μm. More often, the D50 value is equal to or lower than 740 μm. Preferably, the D50 value is equal to or lower than 730 μm. More preferably, the D50 value is equal to or lower than 720 μm. Most preferably, the D50 value is equal to or lower than 710 μm. The D50 value determines that 50% of all particles have a particle size of equal to or lower than the D50. The particle size suitably is determined by laser diffraction. Most preferred is a purified alkaline earth metal carbonate which has a D90 of from 800 to 1000 μm and a D50 of from 500 to 700 μm.

Generally, the BET value of the purified alkaline earth metal carbonate can have a wide range of values. In one embodiment of the present invention, the purified alkaline earth metal carbonate has a BET value of <1 $g/m^2$. The BET value describes the specific surface area of the particle, and is measured by the physical adsorption of gas molecules on the surface of the particle. The BET is suitably measured by N2 isothermic adsorption according to the method of Brenauer-Emmet-Teller (BET).

The invention further concerns the use of a purified alkaline earth metal carbonate, obtainable by the process according to the invention, as additive in the glass or ceramics production and electronics industry. Glass which is manufactured with purified alkaline earth metal carbonate, obtainable by the process according to the invention, as additive, is particularly suited for television production, OLED (organic light-emitting diode) and LCD (liquid crystal displays) devices. The principles of glass manufacturing are described, for example, in U.S. Pat. No. 5,395,806 or Beerkens, R. G. C., Nijnatten, P. A. and Le Bourhis, E. 2011. Glass, 2. Production. Ullmann's Encyclopedia of Industrial Chemistry. Often, the one or more MCO3 obtainable by the process according to the invention is added to the glass melt or mixed with the compounds to be melted in the glass production step. For example, Ceramics which are manufactured with purified alkaline earth metal carbonate, obtainable by the process according to the invention, as additive, are particularly suited for manufacturing electronic parts, for example capacitors or thermistors. US 2009213527, for example, describes a ceramic chip capacitor which is manucfatured using BaCO3 as additive. Generally, in the ceramics production, the one or more purified alkaline earth metal carbonate, obtainable by the process according to the invention, is mixed with other ceramics precursors and heated to form the ceramic material. The purified alkaline earth metal carbonate, obtainable by the process according to the invention, can also be used in the manufacture of luminophores for LED (Light Emitting Diode) production. DE102010030473 and EP2129740B1, for example, describe the use of BaCO3 and SrCO3 as additives in the LED luminophore production. Often, the one or more MCO3 obtainable by the process according to the invention is mixed and heated to form the luminophore material or precursor. All foregoing publications are hereby incorporated by reference.

EXAMPLE

Calcination of Alkaline Earth Metal Carbonate:

CO2 was passed through a solution of MS, obtained by reduction of the corresponding sulfate. The resulting MCO3 was filtered, washed with water and the washing water was separated from MCO3. The recovered MCO3 was heated in a rotary kiln in an atmosphere containing oxygen to about 800° C. The calcination product was cooled to ambient temperature.

Washing of the Calcinated Alkaline Earth Metal Carbonate:

A 100 g sample of product was inserted into 500 mL of a solution of soda containing 10-20 stoichiometric equivalents calculated on the sulfur content of the calcinated MCO3 in a beaker glass. The suspension was stirred at 25° C. and ~250 rpm for 15 minutes and then filtrated by suction filter. The residue was washed three times with the threefold volume (compared to the MCO3 volume) of hot pure water and dried at 130 ° C. in a drying cabinet.

| Raw Material | Initial MSO4 content | Final MSO4 Content | Final Sulfur content |
|---|---|---|---|
| BaCO3 Granules | 0.26% | 0.03% | 40 ppm |
| BaCO3 Granules | 0.35% | 0.04% | 55 ppm |
| BaCO3 Powder (not calcinated, comparative example) | 0.49% | 0.33% | 450 ppm |
| SrCO3 Granules | 0.36% | 0.01% | 15 ppm |

Washing of the Calcinated Alkaline Earth Metal Carbonate at different Temperatures: A 100 g sample of product was inserted into 500 mL of a solution of soda containing 10-20 stoichiometric equivalents calculated on the sulfur content of the calcinated MCO3 in a beaker glass. The suspension was stirred at indicated temperature and ~250 rpm for 15 minutes and then filtered by suction filter. The residue was washed three times with the threefold volume (compared to the MCO3 volume) of hot pure water and dried at 160 ° C. in a drying cabinet.

Initial Sulfur content calcinated BaCO3: 275 ppm
Final Sulfur content calcinated BaCO3, after washing at 20° and drying: 140 ppm
Final Sulfur content calcinated BaCO3, after washing at 90° and drying: 74 ppm

The invention claimed is:

1. A process for the manufacture of a purified alkaline earth carbonate, comprising the steps of
   a) calcining an alkaline earth metal carbonate, wherein the alkaline earth metal carbonate is $BaCO_3$ and/or $SrCO_3$,
   b) washing the calcinated alkaline earth metal carbonate with an aqueous phase comprising a metal salt.

2. The process according to claim 1, wherein the alkaline earth metal carbonate of step a) has a particle size D90 value of from 700 to 1100 μm and a particle size D50 value of from 350 to 750 μm after calcination.

3. The process according to claim 1, wherein the calcination procedure of step a) is performed at a temperature of from 150 to 1000° C.

4. The process according to claim 1, wherein the metal salt comprised in the aqueous phase of step b) is a carbonate, chloride, bromide, phosphate or citrate.

5. The process according to claim 4, wherein the metal salt is an alkali metal carbonate.

6. The process according to claim 5, wherein the metal salt is sodium carbonate.

7. The process according to claim 4, wherein the metal salt comprised in the aqueous phase of step b) is a carbonate.

8. The process according to claim 1, wherein the content of metal salt in the aqueous phase of step b) corresponds to from 1 to 200 equivalents, wherein 1 equivalent is one mole metal salt cation, if the metal salt cation is divalent, or is two moles metal salt cation, if the metal salt cation is monovalent, per mole of $MSO_4$, wherein M is an alkaline earth metal, formed by oxidation of all sulfur impurities in the calcination product of step a).

9. The process according to claim 8, wherein the content of metal salt in the aqueous phase of step b) corresponds to from 10-20 equivalents.

10. The process according to claim 1, wherein step b) is repeated.

11. The process according to claim 1, wherein the alkaline earth metal carbonate provided to the calcination procedure of step a) has a total sulfur content of from 200 to 1700 ppm.

12. The process according to claim 1, wherein the alkaline earth metal carbonate after step b) has a total sulfur content of from 0.1 to 200 ppm.

13. The process according to claim 1, wherein the alkaline earth metal carbonate provided to the calcination procedure of step a) has a particle size D90 value of from 12 to 30 μm and a has a particle size D50 value of from 2,5 to 9 μm.

* * * * *